United States Patent
Tsuruoka

(10) Patent No.: US 7,812,865 B2
(45) Date of Patent: Oct. 12, 2010

(54) IMAGE PICKUP SYSTEM WITH NOISE ESTIMATOR

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 1457 days.

(21) Appl. No.: 10/646,637

(22) Filed: Aug. 22, 2003

(65) Prior Publication Data

US 2005/0099515 A1 May 12, 2005

(30) Foreign Application Priority Data

Aug. 22, 2002 (JP) .............................. 2002-242400

(51) Int. Cl.
H04N 5/217 (2006.01)
(52) U.S. Cl. ..................................... 348/241
(58) Field of Classification Search .............. 348/222.1, 348/241, 242, 243, 244
See application file for complete search history.

(56) References Cited

U.S. PATENT DOCUMENTS

| | | | |
|---|---|---|---|
| 5,661,521 A * | 8/1997 | Curtis et al. ................. | 348/249 |
| 5,999,215 A * | 12/1999 | Tamura ........................ | 348/345 |
| 6,256,414 B1 * | 7/2001 | Mancuso et al. ............. | 382/232 |
| 6,545,775 B1 * | 4/2003 | Watanabe et al. ........... | 358/442 |
| 7,054,501 B1 * | 5/2006 | Gindele et al. .............. | 382/266 |
| 7,064,785 B2 * | 6/2006 | Prentice et al. ............. | 348/243 |
| 7,158,183 B1 * | 1/2007 | Ohta ........................... | 348/364 |
| 7,242,434 B2 * | 7/2007 | Sugimoto et al. ........... | 348/349 |
| 2003/0133033 A1 * | 7/2003 | Tanaka ........................ | 348/335 |
| 2003/0179944 A1 * | 9/2003 | Gindele et al. .............. | 382/260 |

FOREIGN PATENT DOCUMENTS

| | | |
|---|---|---|
| CN | 1292621 A | 4/2001 |
| EP | 12893009 A1 | 3/2003 |
| JP | 200023173 | 1/2000 |
| JP | 2001157057 | 6/2001 |
| JP | 2002057900 | 2/2002 |
| JP | 2003153290 | 5/2003 |

* cited by examiner

Primary Examiner—Justin P Misleh
(74) Attorney, Agent, or Firm—Volpe and Koenig, P.C.

(57) ABSTRACT

An image pickup system has a noise estimating unit which estimates the amount of noise contained in a digitized signal from an image pickup element composed of an array of a plurality of pixels, either for each pixel or for each specified unit area made up of a plurality of pixels, and a shooting conditions estimation unit which estimates the shooting condition when an image based on the signal is acquired. The amount of noise estimated by the noise estimating unit is corrected on the basis of the shooting conditions estimated by the shooting conditions estimation unit, and the noise in the signal is reduced on the basis of the corrected amount of noise.

32 Claims, 12 Drawing Sheets

IMAGE PICKUP SYSTEM WITH NOISE ESTIMATOR

CROSS REFERENCE TO RELATED APPLICATION(S)

This application claims benefits of Japanese Application No. 2002-242400 filed in Japan on Aug. 22, 2002, the contents of which are incorporated by this reference.

BACKGROUND OF THE INVENTION

1. Field of the Invention

The present invention relates to an image pickup system and image processing program which reduce random noise arising in the image pickup element system.

2. Description of the Related Art

Generally, noise components are contained in digitized signals obtained from image pickup elements and the associated analog circuits and A/D converters. Such noise components can be divided into two main categories, i.e., fixed pattern noise and random noise.

The abovementioned fixed pattern noise, as typified by defective pixels or the like, is noise that originates mainly in the image pickup elements.

On the other hand, random noise is generated in the image pickup elements and analog circuits, and has characteristics that are close to white noise characteristics.

In regard to the latter random noise, for example, a technique in which the amount of noise N is converted into a function by $N = ab^{cD}$ using constant terms a, b and c that are given as static terms, and the signal level D converted into a density value, the amount of noise N for the signal level D is estimated from this function, and the filtering frequency characteristics are controlled on the basis of the estimated amount of noise N, is disclosed in Japanese Patent Application Laid-Open No. 2001-157057. Using this technique, an appropriate noise reduction treatment can be performed on the signal level.

Furthermore, as another example, a technique such that the difference value $\Delta$ between a pixel of interest and a nearby pixel is determined, the average pixel number n used in the moving average method is controlled by the function $n = a/(\Delta + b)$ using the determined difference value $\Delta$ and constant terms a and b that are given as static terms, and a moving average is not determined in cases where the determined difference value $\Delta$ is equal to or greater than a specified threshold value, is described in Japanese Patent Application Laid-Open No. 2002-57900. By using such a technique, it is possible to perform a noise reduction treatment without causing any deterioration of the original signal such as edges or the like.

However, since the amount of noise varies dynamically according to factors such as the temperature at the time of shooting, exposure time, gain and the like, conversion to a function that matches the amount of noise during shooting cannot be handled in the case of a technique using static constant terms such as that described in the abovementioned Japanese Patent Application Laid-Open No. 2001-157057, so that the precision in estimating the amount of noise is inferior. Furthermore, the filtering frequency characteristics are controlled from the amount of noise; however, since this filtering performs processing equally without discriminating between flat portions and edge portions, the edge portions deteriorate in regions where it is estimated on the basis of the signal level that the amount of noise is large. Specifically, processing that discriminates between the original signal and noise cannot be handled, so that the preservation of the original signal is poor.

Furthermore, in the technique described in Japanese Patent Application Laid-Open No. 2002-57900, the determination of whether or not the moving average method is performed is accomplished by comparison with a threshold value. However, since this threshold value is also given as a static value, variation in the amount of noise according to the signal level cannot be handled, so that the selection of the average number of pixels or moving average method cannot be optimally controlled. Consequently, noise components remain, and there is a deterioration of the original signal and the like.

Furthermore, in cases where there are differences in the conditions during shooting or subjects of shooting, e.g., in the case of flat subject of shooting such as skin or the like, or subject of shooting that has a texture structure, the subjective evaluation may be different even if the amount of noise is the same. However, in the abovementioned prior art, such points cannot be handled, so that there is a drawback that a subjectively ideal image may not always be obtainable even if noise reduction processing is performed.

SUMMARY OF THE INVENTION

In short, the image pickup system comprises: a noise estimating unit which estimates the amount of noise contained in the digitized signal from an image pickup element in which a plurality of pixels are arranged, either for each pixel or for each specified unit area comprising a plurality of pixels; and a shooting situation estimating unit which estimates the shooting situation at the time that an image based on the abovementioned signal is shot. The amount of noise estimated by the abovementioned noise estimating unit is corrected on the basis of the shot situation estimated by the abovementioned shooting situation estimation unit, and the noise in the abovementioned signal is reduced on the basis of the corrected amount of noise.

Additional features and advantages of the invention will be set forth in the description which follows, and in part will be obvious from the description, or may be learned by the practice of the invention. The features and advantages of the invention may be realized and obtained by means of the instrumentalities and combinations particularly pointed out hereinafter.

DESCRIPTION OF THE PREFERRED EMBODIMENTS

Embodiments of the present invention will be described below with reference to the attached figures.

Figure 1:
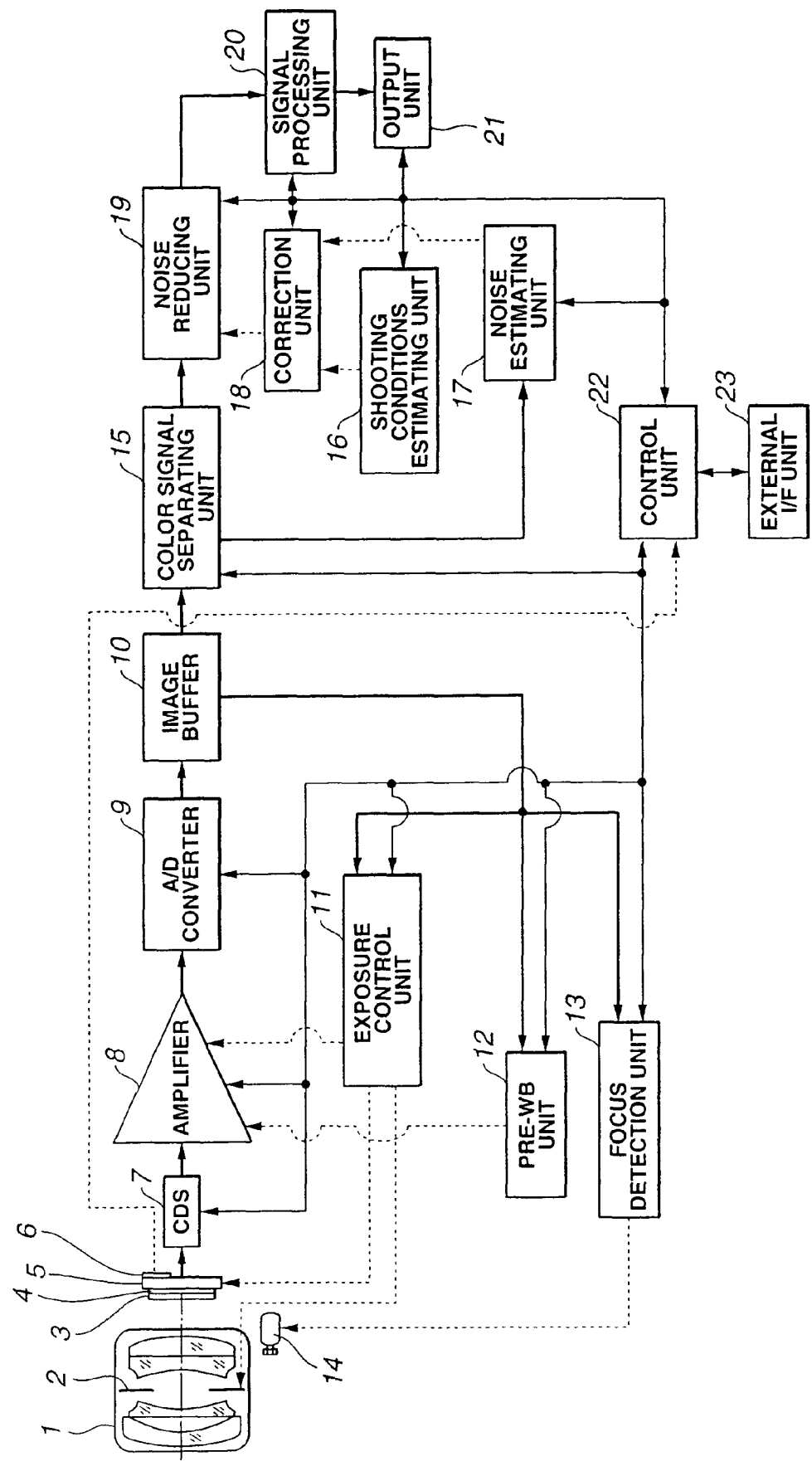
FIG. 1 is a block diagram which shows the construction of the image pickup system in a first embodiment of the present invention.
Figure 2:
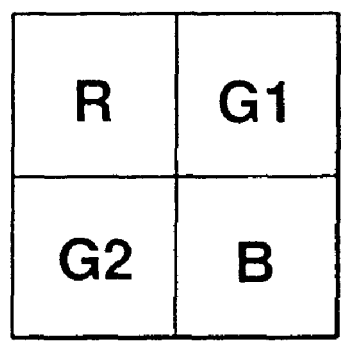
FIG. 2 is a diagram which shows the primary color Bayer type filter construction in the color filters of the abovementioned first embodiment.
Figure 4:
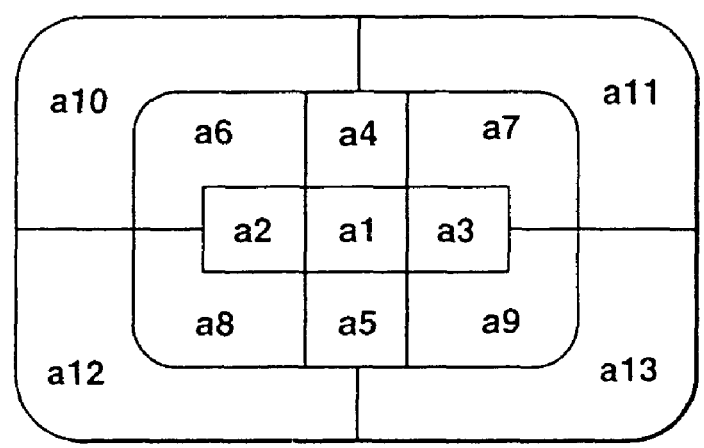
FIG. 4 is a diagram which is used to illustrate the split pattern used for exposure controlling and the parameters used for evaluation in the above-mentioned first embodiment.
Figure 3:
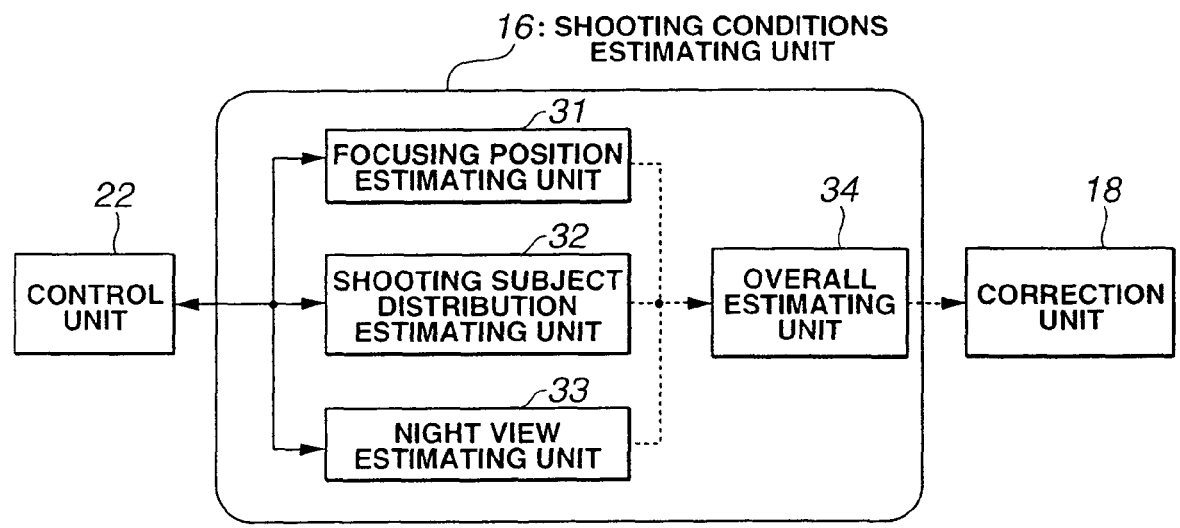
FIG. 3 is a block diagram which shows the construction of the shooting situation estimation unit in the abovementioned first embodiment.
Figure 5:
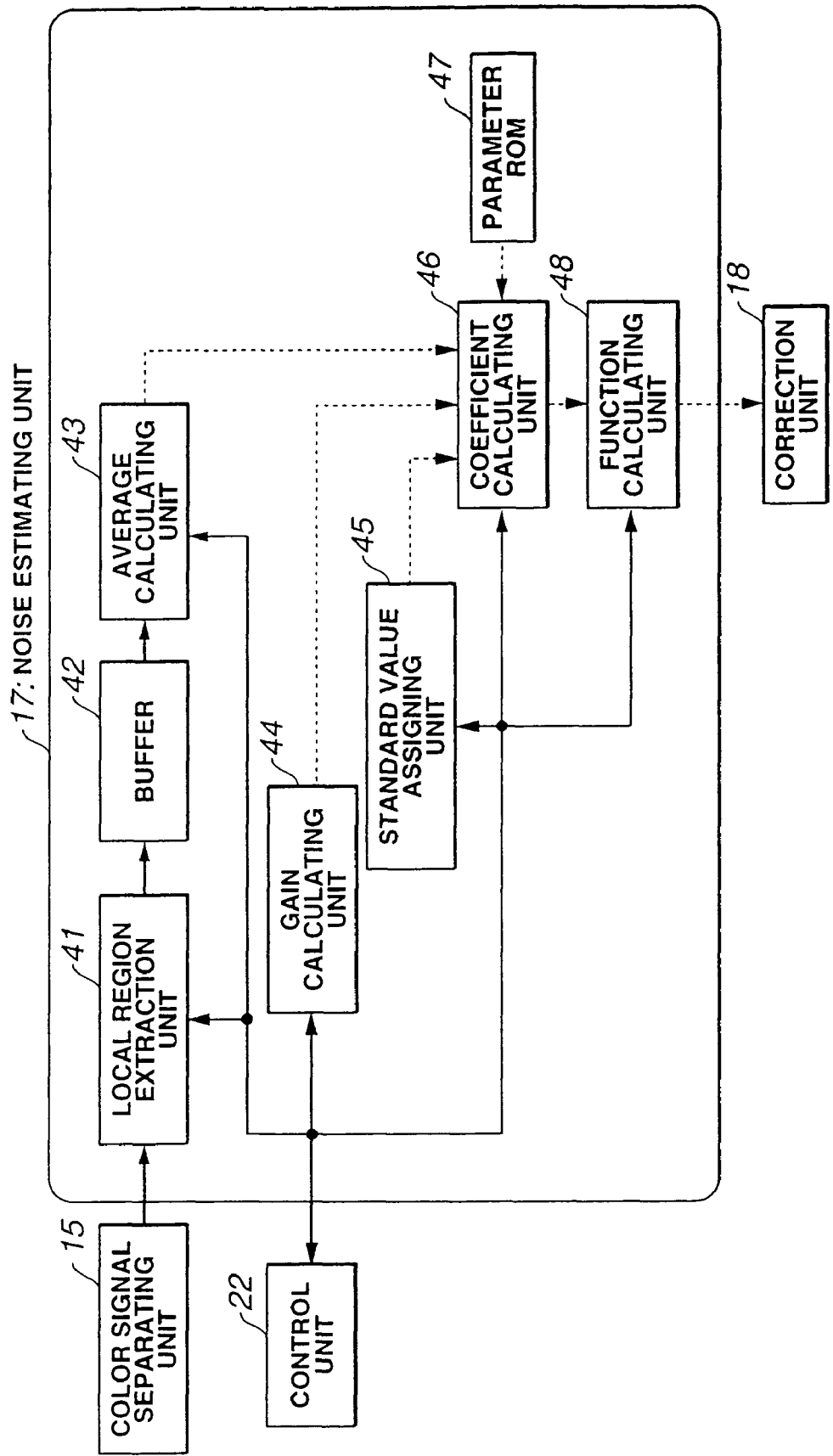
FIG. 5 is a block diagram which shows the construction of the noise estimating unit in the abovementioned first embodiment.
Figure 6:
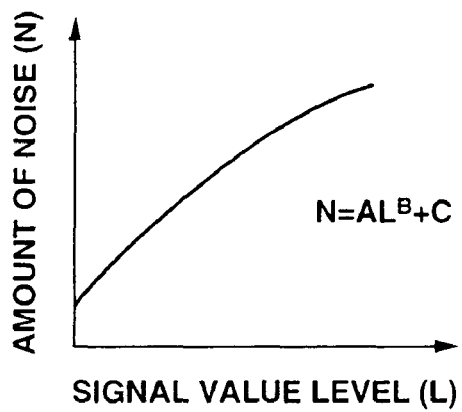
FIG. 6 is a diagram which is used to illustrate the formulization of the amount of noise in the abovementioned first embodiment.
Figure 7:
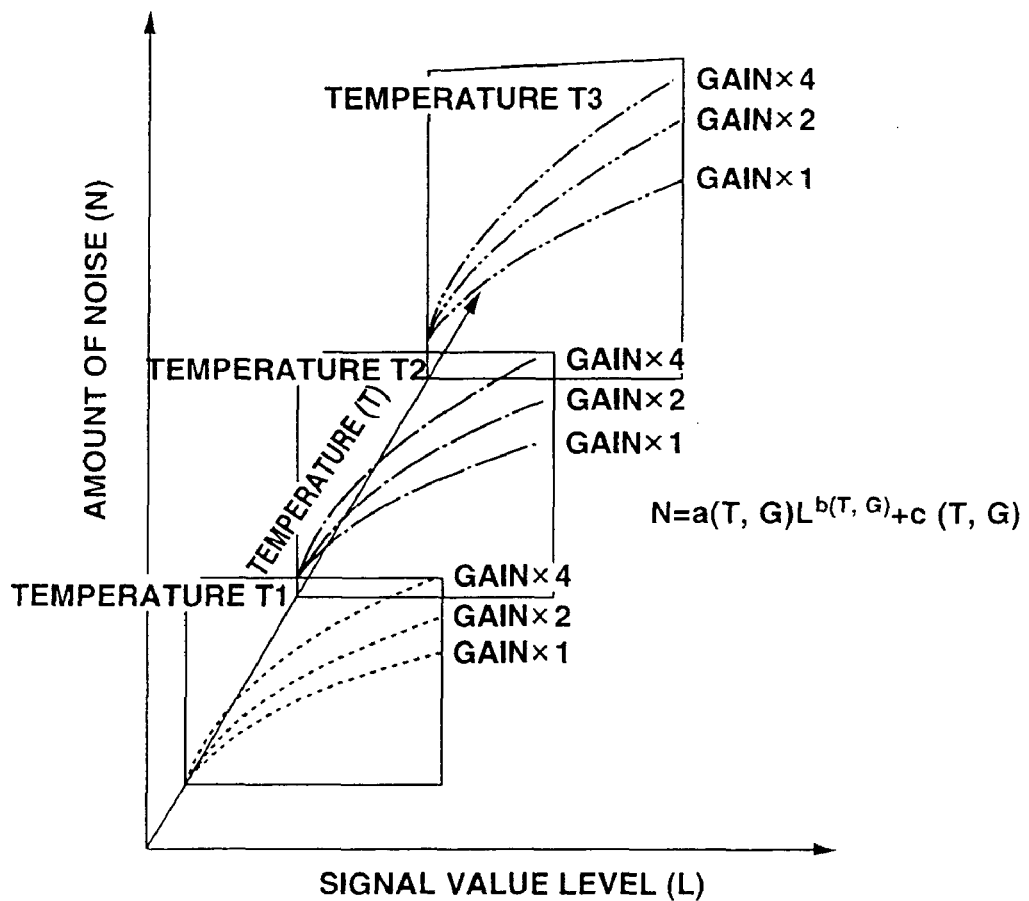
FIG. 7 is a diagram which is used to illustrate the formulization of the amount of noise in the abovementioned first embodiment.
Figure 8A:
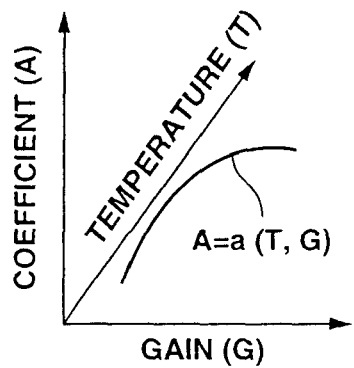
FIG. 8A is a diagram which is used to illustrate the parameters used in the formulization of the amount of noise in the abovementioned first embodiment.
Figure 8B:
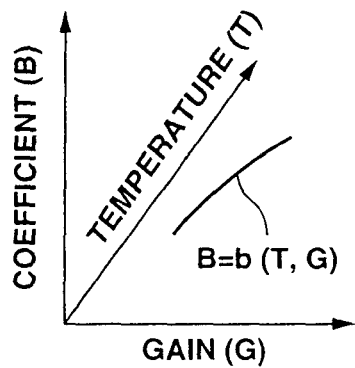
FIG. 8B is another diagram which is used to illustrate the parameters used in the formulization of the amount of noise in the abovementioned first embodiment.
Figure 8C:
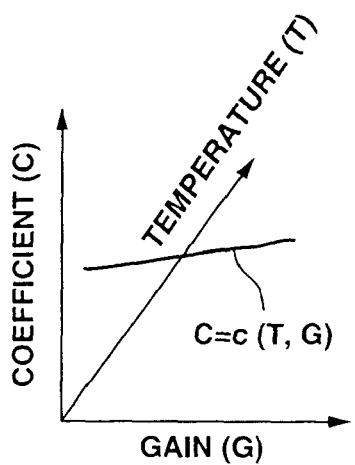
FIG. 8C is another diagram which is used to illustrate the parameters used in the formulization of the amount of noise in the abovementioned first embodiment.
Figure 8D:
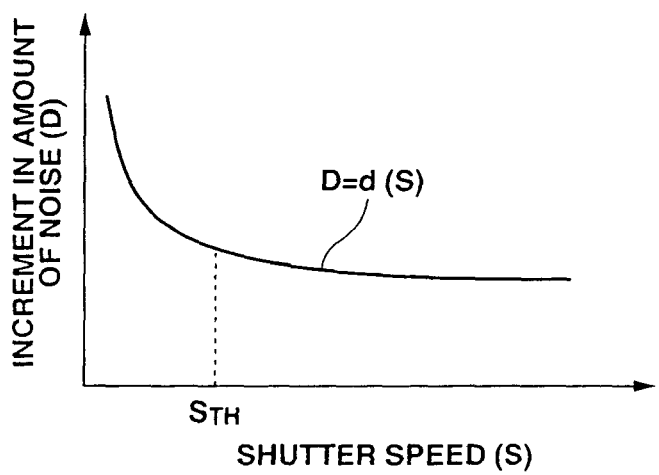
FIG. 8D is still another diagram which is used to illustrate the parameters used in the formulization of the amount of noise in the abovementioned first embodiment.
Figure 9:
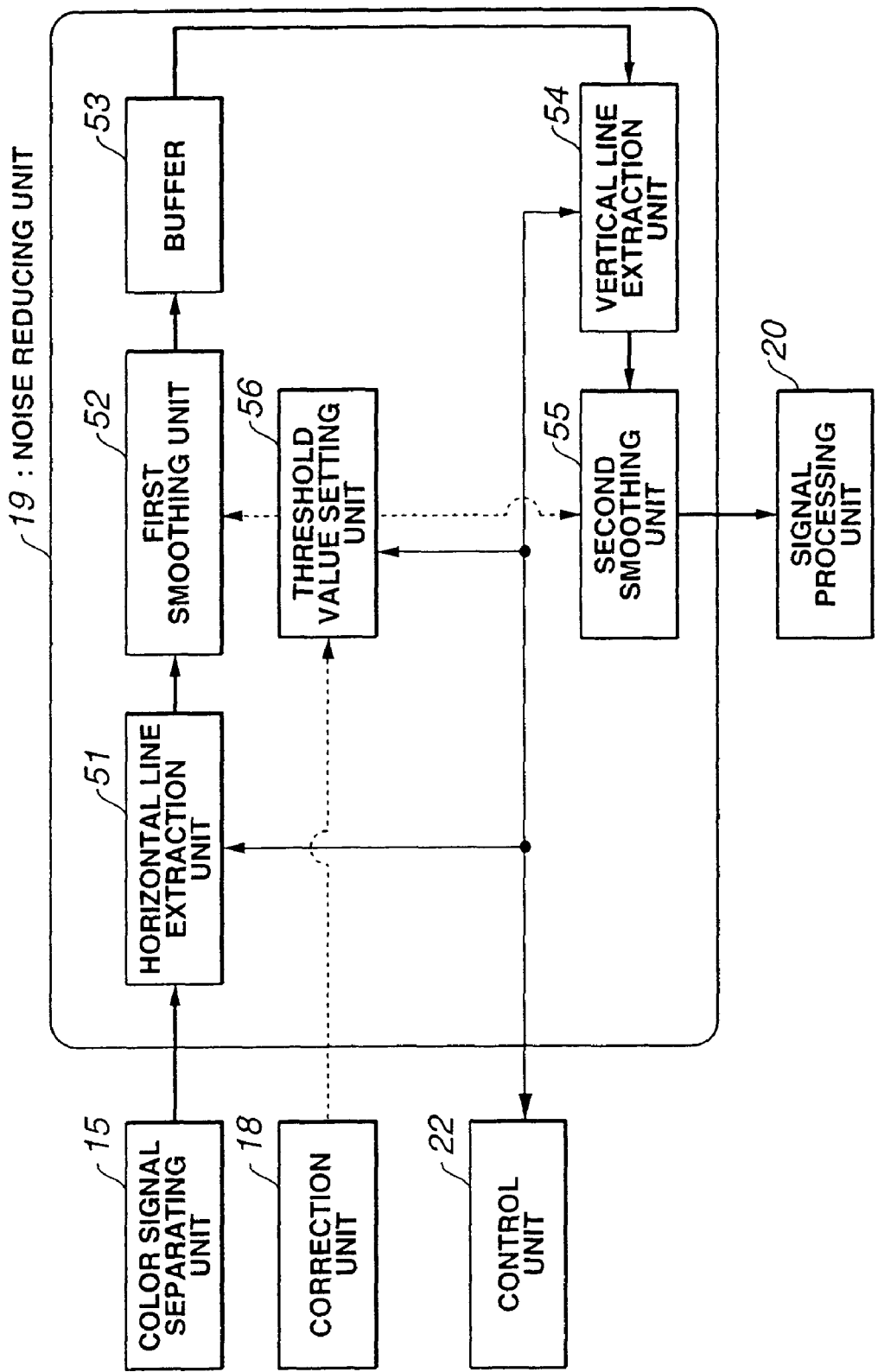
FIG. 9 is a block diagram which shows the construction of the noise reducing unit in the abovementioned first embodiment.

FIGS. 1 through 9 show a first embodiment of the present invention. FIG. 1 is a block diagram which shows the construction of the image pickup system, FIG. 2 is a diagram which shows the primary color Bayer type filter construction in the color filters, FIG. 3 is a block diagram which shows the construction of the shooting situation estimating unit, FIG. 4 is a diagram which is used to illustrate the split pattern used for exposure controlling and the parameters used for evaluation, FIG. 5 is a block diagram which shows the construction of the noise estimating unit, FIGS. 6 and 7 are diagrams which are used to illustrate the formulization of the amount of noise, FIGS. 8A through 8D are diagrams which are used to illustrate the parameters used in the formulization of the amount of noise, and FIG. 9 is a block diagram which shows the construction of the noise estimating unit.

As is shown in FIG. 1, this image pickup system comprises: a lens system 1 which is used to form an image of the subject of shooting, an aperture 2 which is arranged inside the lens system 1, and which is used to regulate the transmission range of the luminous flux in the lens system 1; a low-pass filter 3 which is used to eliminate unnecessary high-frequency components from the luminous flux that is formed by the abovementioned lens system 1; primary color Bayer type color filters 4, for example, which are arranged on the surface of a CCD 5 (described later) in the light path of the luminous flux focused by the abovementioned lens system 1; a CCD 5 constituting a black and white image pickup element which subjects the optical subject image that is formed via the color filter 4 to a photoelectric conversion, and outputs an electrical video signal; a temperature sensor 6 constituting parameter calculating means which is arranged in the vicinity of the abovementioned CCD 5, and which are used to measure the temperature of the CCD 5 in real time and output the measurement results of a control unit 22 (described later); a CDS (correlated double sampling) unit 7 which performs correlated double sampling on the video signal that is output from the abovementioned CCD 5; an amplifier 8 which amplifies the signal that is output from the CDS unit 7; an A/D converter 9 which converts the analog video signal that is amplified by the abovementioned amplifier 8 into a digital signal; an image buffer 10 which temporarily stores the digital image data that is output from the abovementioned A/D converter 9; an exposure control unit 11 which performs exposure controlling relating to the subject on the basis of the image data stored in the abovementioned image buffer 10, and controls the abovementioned aperture 2, CCD 5 and amplifier 8 on the basis of the evaluation results; a pre-WB unit 12 which detects a simple white balance on the basis of the video signal stored in the above-mentioned image buffer 10, and controls the abovementioned amplifier 8 on the basis of the results; a focus detection unit 13 which detects the focal point on the basis of the image data stored in the abovementioned image buffer 10, and drives an AF motor 14 (described later) on the basis of the detection results; the AF motor 14 which is controlled by the abovementioned focus detection unit 13, and which drives a focusing lens or the like contained in the abovementioned lens system 1; a color signal separating unit 15 constituting separating means which reads out the video signal stored in the abovementioned image buffer 10, and separates the color signals; a noise estimating unit 17 constituting noise estimating means which estimates noise (as will be described in detail later) on the basis of the image data that is output from the abovementioned color signal separating unit 15; a shooting conditions estimating unit 16 constituting shooting conditions estimating means which estimates the shooting situation; a correction unit 18 constituting correction means which uses the results of the estimation performed by the abovementioned shooting conditions estimating unit 16 to correct the results of the estimation performed by the abovementioned noise estimating unit 17; a noise reducing unit 19 constituting noise reducing means which reduces the noise of the image data output from the abovementioned color signal separating unit 15 using the estimated noise corrected by the above-mentioned correction unit 18; a signal processing unit 20 which processes the image data output from the abovementioned noise reducing unit 19; an output unit 21 which outputs the image data from the abovementioned signal processing unit 20 in order to record this data on, for example, a memory card or the like; an external I/F unit 23 comprising an interface to the power supply switch, shutter button, mode switches for switching various shooting modes and the like; and a control unit 22 constituting control means comprising a microcomputer or the like which is connected bidirectionally with the abovementioned CDS unit 7, amplifier 8, A/D converter 9, exposure control unit 11, pre-WB unit 12, focus detection unit 13, color signal separating unit 15, shooting conditions estimating unit 16, noise estimating unit 17, correction unit 18, noise reducing unit 19, signal processing unit 20, output unit 21 and external I/F unit 23, and which comprehensively controls the abovementioned image pickup system containing these parts, and also constituting parameter calculating means.

Next, the flow of signals in the image pickup system shown in FIG. 1 will be described.

The abovementioned image pickup system is constructed such that shooting conditions such as the ISO sensitivity and the like can be set via the external I/F unit 23; after these settings have been accomplished, the pre-image-pickup mode is entered by pressing the shutter button, which is a two-stage push button switch.

The video signal, that is imaged by the CCD 5 and output via the abovementioned lens system 1, aperture 2, low-pass filter 3 and color filters 4, is subjected to universally known correlated double sampling in the CDS unit 7 and read out as an analog signal.

This analog signal is amplified by a specified amount by the amplifier 8, converted into a digital signal by the A/D converter 9, and transmitted to the image buffer 10.

The video signal inside the image buffer 10 is then respectively transmitted to the exposure control unit 11, the pre-WB unit 12 and the focus detection unit 13.

The exposure control unit 11 determines the brightness levels in the image, splits the image into a plurality of regions with the set ISO sensitivity, hand movement limit shutter speed and the like taken into account, calculates the appropriate exposure value by combining the brightness levels of the respective regions, and controls the stop value of the aperture 2, the electronic shutter speed of the CCD 5, the amplification factor of the amplifier 8 and the like such that an appropriate exposure value is obtained.

Furthermore, the pre-WB unit 12 calculates a simple white balance by multiplying a signal of a specified level in the video signal by each color signal, transmits the result to the amplifier 8, and achieves a white balance by multiplying this value by a gain that differs for each color signal.

Then, the focus detection unit 13 detects the edge intensity in the image, and obtains a focused image by controlling the AF motor 14 such that this edge intensity is maximized.

When preparations for the real shooting have been completed by performing this pre-image-pickup mode, and it is then detected via the external I/F unit 23 that the shutter button has been fully pressed, real shooting is performed.

This real shooting is performed on the basis of the exposure conditions determined by the exposure control unit 11, the white balance coefficients determined by the pre-WB unit 12, and the focusing conditions determined by the focus detection unit 13, and these shooting situations are transmitted to the control unit 22.

When real shooting is thus performed, the video signal is transmitted to the image buffer 10 and stored in the same manner as in pre-image-pickup.

The video signal inside the image buffer 10 is transmitted to the color signal separating unit 15, and is separated into the respective colors of the color filters.

As is described above, the filter construction of the abovementioned color filters 4 arranged on the front surface of the CCD 5 is as follows: for example, these are primary color Bayer type filters of the type shown in FIG. 2, i.e., filters in which the basic unit is 2×2 pixels, with green (G1 and G2) filters arranged in diagonal positions, and red (R) and blue (B) filters arranged in the remaining diagonal positions. Furthermore, the green filters G1 and G2 are filters having the same optical characteristics; here, however, these filters are distinguished as G1 and G2 for convenience of processing.

The color signal separating unit 15 separates the video signal inside the image buffer 10 in accordance with these four types of color filters R, G1, G2 and B, and this separating operation is performed in synchronization with the processing of the noise estimating unit 17 and the processing of the noise reducing unit 19 under the control of the control unit 22.

Meanwhile, the control unit 22 transmits exposure information and focus information at the time of image pickup from the exposure control unit 11, pre-WB unit 12 and focus detection unit 13 to the shooting conditions estimating unit 16.

On the basis of this transmitted information, the shooting conditions estimating unit 16 estimates the shooting conditions for the entire signal, e.g., typically including conditions such as scenery shooting, portrait shooting, close-up shooting, night view shooting or the like, and transmits the conditions of this shooting situation to the correction unit 18. Such estimation processing of the shooting situation by the shooting conditions estimating unit 16 is performed once for each shooting operation.

Next, the noise estimating unit 17 reads in the respective color signals from the color signal separating unit 15 under the control of the control unit 22; furthermore, shooting conditions such as the exposure conditions determined by the exposure control unit 11, the ISO sensitivity set by the external I/F unit 23 and the like are also transmitted to the noise estimating unit 17 via the control unit 22.

On the basis of the abovementioned information and respective color signals, the noise estimating unit 17 calculates the amount of noise for each specified size, e.g., for each pixel (in pixel units) in the present embodiment, and transmits the calculated amount of noise to the correction unit 18.

On the basis of the shooting conditions output from the shooting estimating unit 16, the correction unit 18 corrects the amount of noise output from the noise estimating unit 17; then, the correction unit 18 transmits the corrected amount of noise to the noise reducing unit 19.

In this case, the processing in the abovementioned noise estimating unit 17 and the processing in the correction unit 18 are performed in synchronization with the processing of the noise reducing unit 19 under the control of the control unit 22.

On the basis of the amount of noise corrected by the correction unit 18, the noise reducing unit 19 performs noise reduction processing on the respective color signals from the color signal separating unit 15, and transmits the processed video signal to the signal processing unit 20.

Under the control of the control unit 22, the signal processing unit 20 performs universally known emphasis processing, compression processing and the like on the video signal that has been subjected to noise reduction, and transmits the processed video signal to the output unit 21.

The output unit 21 records and stores the received video signal on a memory card or the like.

Next, one example of the construction of the shooting conditions estimating unit 16 will be described with reference to FIG. 3.

The shooting conditions estimating unit 16 comprises: a focusing position estimating unit 31 constituting focusing position estimating means that acquires the AF information set by the abovementioned focus detection unit 13 from the control unit 22, and classifies this information into, for example, 5 m to infinity (scenery shooting), 1 m to 5 m (portrait shooting), 1 m and less (close-up shooting) or the like; a shooting-subject distribution estimating unit 32 constituting shooting-subject distribution estimating means that acquires the split photometrical results of the above-mentioned exposure control unit 11 from the control unit 22 and calculates evaluation parameters S1 through S3 (described later); a night view estimating unit 33 which acquires AE information from the abovementioned exposure control unit 11 via the control unit 22, and estimates that the shooting situation is night view shooting in cases where the exposure time is longer than a specified shutter speed, and the average brightness level for the overall signal is equal to or less than a specified threshold value; and an overall estimating unit 34 constituting overall estimating means that determines the gain used to perform a correction for the amount of noise on the basis of the results of the classification performed by the abovementioned focusing position estimating unit 31, the results of the estimation performed by the abovementioned shooting-subject distribution estimating unit 32 and the results of the estimation performed by the abovementioned night view estimating unit 33, and transfers the gain thus determined to the correction unit 18.

Furthermore, the abovementioned focusing position estimating unit 31, shooting-subject distribution estimating unit 32 and night view estimating unit 33 are connected bidirectionally with the control unit 22.

For example, as is shown in FIG. 4, the abovementioned exposure control unit 11 splits the signal from the CCD 5 into 13 regions, and performs universally known split photometry.

In the example shown in the figures, the image pickup region of the CCD 5 is classified into a centermost portion, an inner peripheral portion that surrounds this centermost portion, and an outer peripheral portion that surrounds this inner peripheral portion. Furthermore, these portions are further divided into regions as described below.

Specifically, the centermost portion is divided into a middle region (with an average brightness level indicated by $a1$), a region adjacent to this middle region on the left (with an average brightness level indicated by $a2$), and a region adjacent to this middle region on the right (with an average brightness level indicated by $a3$).

Furthermore, the inner peripheral portion is divided into regions (with average brightness levels respectively indicated by $a4$ and $a5$) above and below the region with an average brightness level of $a1$, regions (with average brightness levels respectively indicated by $a6$ and $a7$) located to the left and right of the region with an average brightness level of $a4$, and regions (with average brightness levels respectively indicated by $a8$ and $a9$) located to the left and right of the region with an average brightness level of $a5$.

Furthermore, the outer peripheral portion is divided into an upper left region (with an average brightness level indicated by $a10$), an upper right region (with an average brightness level indicated by $a11$), a lower left region (with an average brightness level indicated by $a12$), and a lower right region (with an average brightness level indicated by $a13$).

The average brightness levels of the respective regions produced by such a division are transmitted to the shooting subject distribution estimating unit 32 from the exposure control unit 11.

In the split photometry using such regions, the abovementioned shooting-subject distribution estimating unit 32 calculates the respective evaluation parameters shown below as shown in the following equation 1, equation 2 and equation 3, and transmits the results of these calculations to the overall estimating unit 34.

$$S1=|a2-a3| \quad (1)$$

$$S2=\max(|a4-a6|,|a4-a7|) \quad (2)$$

$$S3=\max(a10,a11)-Av \quad (3)$$

where $$Av=(\Sigma ai)/13$$

Here, max( ) is a function which gives the maximum value of the number in parentheses, $\Sigma$ indicates the sum for all i (i.e., i=1 to 13), and Av indicates the average brightness level for all of the photometrical regions (the average brightness level for the overall signal).

Thus, the evaluation parameter S1 indicates the left-right brightness difference of the centermost portion (central portion), the evaluation parameter S2 indicates the larger of the brightness differences between the upper side center and upper side left or between the upper side center and upper side right of the inner peripheral portion (central emphasis), and the evaluation parameter S3 indicates the difference between the average brightness of the overall signal and whichever is larger of the upper side left and the upper side right of the outer peripheral portion (overall signal).

As is described above, the abovementioned overall estimating unit 34 determines the gain that is used to correct the amount of noise in accordance with the respective outputs of the abovementioned focusing position estimating unit 31, the shooting-subject estimating unit 32 and the abovementioned night view estimating unit 33. Here, in cases where the estimation results from the night view estimating unit 33 indicate night view shooting, "strong", e.g., a value of 1.5 to 2.0, is designated as the gain; this gain is immediately sent to the correction unit 18, and the processing is ended.

On the other hand, in cases where it is estimated that the shooting is not night view shooting, the overall estimating unit 34 estimates the shooting situation and determines the gain as shown in Table 1 using the classification results from the focusing position estimating unit 31, and the evaluation parameters S1 through S3 from the shooting-subject distribution estimating unit 32.

TABLE 1

| AF INFORMATION | AE INFORMATION | SHOOTING SCENE | GAIN |
| --- | --- | --- | --- |
| 5 m~ | S3 > Th1 | SCENERY WITH SKY IN UPPER PART | STRONG |
|  | S3 < Th1 | SCENERY WITH NO (OR LITTLE) SKY IN UPPER PART | MEDIUM |
| 1 m~5 m | S2 > Th2 | PORTRAIT OF ONE PERSON | MEDIUM |
|  | S2 < Th2 | PLURALITY OF PORTRAITS | STRONG |
| 1 m OR LESS | S1 > Th3 | CLOSE-UP OF PLURALITY OF OBJECTS | WEAK |
|  | S1 < Th3 | CLOSE-UP OF SINGLE OBJECT | MEDIUM |

As is shown in Table 1, when the AF information is 5 m to infinity, the shooting subject is considered to be scenery, and the abovementioned evaluation parameter S3 is further compared with a specified value Th1. In this case, if the evaluation parameter S3 is larger than the specified value Th1, at least one of the values a10 or a11 shows a brightness that is higher by at least a certain amount than the average brightness of the overall signal; accordingly, it is estimated that the shooting involves scenery with sky in the upper part. Since the sky is flat and this is a region where noise components are subjectively a problem, a "strong" gain (e.g., 1.5 to 2.0) is designated as the gain used for correction. On the other hand, in cases where the evaluation parameter S3 is smaller than the specified value Th1, it is conversely estimated that the shooting situation is scenery with no sky (or a little sky) in the upper part. In this case, it appears that the main shooting subject is an object with a textured structure such as plants, buildings or the like; accordingly, a "medium" gain (e.g., 1.0 to 1.5) is designated as the gain used for correction.

Next, in cases where the AF information is 1 m to 5 m, it is assumed that the shooting is for portrait, and the abovementioned evaluation parameter S2 is further compared with a specified value Th2. In this case, if the evaluation parameter S2 is larger than the specified value Th2, there is a brightness difference between the upper side center a4 of the inner peripheral portion and either the upper side left or right a6 or a7 of the inner peripheral portion; accordingly, it is estimated that the shooting situation is in portrait shooting of a single person. In the case of portrait shooting of a single person, the area of the face, i.e., the area which is flat and in which noise tends to be conspicuous, is relatively large. Accordingly, while it is desirable on the one hand to strengthen the gain used for correction, hair which has a fine structure is also present; accordingly, if this hair is solid, this will be evaluated as a deterioration in the image quality. Consequently, a "medium" gain is designated as the gain used for correction. On the other hand, in cases where the evaluation parameter S2 is smaller than the specified value Th2, it is estimated that the shooting situation is for portrait of a plurality of persons. In the case of portrait shooting of a plurality of persons, the area of the faces is relatively small, and the fine structure of the hair is difficult to distinguish. Accordingly, a "strong" gain is designated as the gain used for correction.

Furthermore, in cases where the AF information is 1 m or less, it is judged that the shooting is for close-up, and the abovementioned evaluation parameter S1 is further compared with a specified value Th3. In this case, if the evaluation parameter S1 is larger than the specified value Th3, there is a brightness difference between the left and right of the centermost portion, and it is estimated that the shooting situation is for close-up of a plurality of objects. In this case, it would appear that there is fine structure in the principle objects of shooting; accordingly, a "weak" gain (e.g., 0.5 to 1.0) is designated as the gain used for correction. On the other hand, in cases where the evaluation parameter S1 is smaller than the specified value Th3, it is estimated that the shooting situation is for close-up of a single object. In this case, it is difficult to judge the presence or absence of fine structure; accordingly, all-purpose characteristics are taken into account, and a "medium" gain is designated as the gain used for correction.

The gain used for correction that has thus been set by the overall estimating unit 34 is transmitted to the correction unit 18 as described above.

Next, one example of the construction of the noise estimating unit 17 will be described with reference to FIG. 5.

The noise estimating unit 17 comprises: a local region extraction unit 41 which extracts local regions of a specified size in specified positions in each color signal that is output from the abovementioned color signal separating unit 15; a buffer 42 which stores the color signals of the local regions extracted by the local region extraction unit 41; a gain calculating unit 44 constituting parameter calculating means that calculates the amount of amplification of the abovementioned amplifier 8 on the basis of information relating to the exposure conditions and information relating to the white balance coefficients transmitted from the abovementioned control unit 22; a standard value assigning unit 45 constituting assigning means that assigns standard values in cases where any of the parameters are omitted; an average calculating unit 43 constituting parameter calculating means that reads out the signals of the local regions stored in the abovementioned buffer 42, calculates average values and transmits these values to a coefficient calculating unit 46 as signal value levels; a parameter ROM 47 constituting coefficient calculating means that stores parameters relating to functions (described later) that are used to estimate the amount of noise; a coefficient calculating unit 46 serving as coefficient calculating means as well as noise amount calculating means that calculates coefficients involved in specified equations that are used to estimate the amount of noise of pixels of interest on the basis of the parameters that are read out from the abovementioned parameter ROM 47, information relating to the temperature of the image pickup element that is output from the temperature sensor 6 or standard value assigning unit 45 via the abovementioned control unit 22, signal value levels that are output from the abovementioned average calculating unit 43 or the abovementioned standard value assigning unit 45, the amount of amplification that is output from the abovementioned gain calculating unit 44 or the abovementioned standard value assigning unit 45, and information relating to the shutter speed that is output from the above-mentioned control unit 22 or the abovementioned standard value assigning unit 45; and a function calculating unit 48 serving as function calculating means as well as noise amount calculating means that calculates the amount of noise using functions that are formulized (as will be described later) using the coefficients that are output from the abovementioned coefficient calculating unit 46 and transfers the amount of noise thus calculated to the correction unit 18.

In the present embodiment, since the processing of the noise reducing unit 19 (as will be described later) is separated into the horizontal direction and vertical direction, the abovementioned local region extraction unit 41 is devised such that this unit performs extraction while successively scanning the entire image in, for example, 4×1 size units in the case of horizontal direction processing, and, for example, 1×4 size units in the case of vertical direction processing. The processing performed by this local region extraction unit 41 is performed in synchronization with the processing of the noise reducing unit 19.

Furthermore, the abovementioned control unit 22 is connected bidirectionally with the abovementioned local region extraction unit 41, average calculating unit 43, gain calculating unit 44, standard value assigning unit 45, coefficient calculating unit 46, and function calculating unit 48, and controls these units.

Next, the formulization of the amount of noise that is used when the coefficient calculating unit 46 estimates the amount of noise for pixels of interest will be described with reference to FIG. 7.

The function of the amount of noise N with respect to the signal value level L is formulized as indicated in equation 4 below.

$$N = AL^B + C \tag{4}$$

Here, A, B and C are constant terms, and the constant terms are added to a function that forms a power of the signal value level L.

When the outline of this function is plotted in a case where (for example) A>0, 0<B<1 and C>0, the shape shown in FIG. 6 is obtained.

However, the amount of noise N does not depend on the signal value level L alone, but also varies according to the temperature of the CCD 5 which is the image pickup element and the gain of the amplifier 8. Accordingly, FIG. 7 shows an example in which these factors are also taken into account.

Specifically, as is shown in equation 5, a(T, G), b(T, G) and c(T, G) which use the temperature T and gain G as parameters, are introduced instead of A, B and C, which were constant terms on the abovementioned equation 4.

$$N = a(T,G)L^{b(T,G)} + c(T,G) \tag{5}$$

FIG. 7 shows the curves indicated by this equation 5 plotted for a plurality of gains G (1, 2 and 4 times in the example shown in the figures) at a plurality of temperatures T (temperatures T1 through T3 in the example shown in the figures).

In FIG. 7, the independent variable is shown as the signal value level L, and the dependent variable is shown as the amount of noise N. The temperature T which constitutes a parameter is plotted on a coordinate axis in a direction that is perpendicular to these variables. Accordingly, the amount of noise N according to the signal value level L is respectively read within the plane expressed by T=T1, within the plane expressed by T=T2, and within the plane expressed by T=T3. In this case, furthermore, the curve shape of the gain G, which is a parameter, is expressed by drawing a plurality of curves within the respective planes.

The individual curves indicated by the respective parameters show configurations that are more or less similar to the curves produced by equation 4 shown in FIG. 6; however, the respective coefficients a, b and c naturally differ according to the respective values of the temperature T and gain G.

FIG. 8A shows an outline of the characteristics of the above-mentioned function a(T, G), FIG. 8B shows an outline of the characteristics of the above-mentioned function b(T, G), and FIG. 8C shows an outline of the characteristics of the abovementioned function c(T, G).

Since these respective functions are two-variable functions with the temperature T and gain G as independent variables, FIGS. 8A through 8C are plotted as three-dimensional coordinates, and show curved surfaces in these plotted spaces. Here, however, instead of showing concrete curved shapes, the conditions of major changes in the characteristics are shown using curved lines.

The respective constant terms A, B and C are output by inputting the temperature T and gain G into such functions a, b and c as parameters. Furthermore, the concrete shapes of these functions can easily be acquired by measuring the characteristics of the image pickup element system including the CCD 5 and amplifier 8 beforehand.

Random noise shows a tendency to increase as the exposure time becomes longer. As a result, if the combination of shutter speed and stop value differs, there may be a difference in the amount of noise that is generated, even if the amount of exposure is the same. Accordingly, an example in which correction is performed with such differences also being taken into account will be described with reference to FIG. 8D.

Here, a correction coefficient d(S) which gives the constant term D is introduced with the shutter speed S as a parameter, and a correction based on the formulization shown in equation 6 is performed by means that multiplies this correction coefficient by equation 5.

$$N = \{a(T,G)L^{b(T,G)} + c(T,G)\}d(S) = (AL^B + C)D \tag{6}$$

The function shape of this correction coefficient d(S) is obtained by measuring the characteristics of the image pickup element system beforehand; for example, this function has the shape indicated in FIG. 8D. FIG. 8D shows the conditions of the increment D in the amount of noise relative to the shutter speed S.

As is shown in the FIG. 8D, the increment D in the amount of noise has the property of increasing abruptly when the shutter speed S is smaller than a certain threshold value $S_{TH}$ (i.e., when the exposure time is long). Accordingly, the system is divided into two procedures depending on whether or not the shutter speed S is equal to or greater than this threshold value $S_{TH}$. In the case of a long exposure, the function d(S) is used; however, in the case of a short exposure, the system may be simplified by using fixed coefficients.

The four functions a(T, G), b(T, G), c(T, G) and d(S) described above are recorded in the abovementioned buffer ROM 47. Furthermore, the correction for the shutter speed need not necessarily be prepared as a function; it would also be possible to prepare this correction by some other means, e.g., as a table or the like.

The coefficient calculating unit 46 calculates the respective fixed terms A, B, C and D using the four functions recorded in the parameter ROM 47, with the temperature T, gain G and shutter speed S acquired dynamically (or acquired from the standard value assigning unit 45) as input parameters, and transmits these constant terms to the function calculating unit 48.

The function calculating unit 48 determines the function shape used to calculate the amount of noise N by applying the respective constant terms A, B, C and D calculated by the abovementioned coefficient calculating unit 46 to the abovementioned equation 6, and calculates the amount of noise N by means of the signal value level L output from the abovementioned average calculating unit 43 via the abovementioned coefficient calculating unit 46.

In this case, the respective parameters such as the temperature T, gain G, shutter speed S and the like need not always be determined for each shooting operation. It is also possible to construct the system such that arbitrary parameters are stored in the standard value assigning unit 45, and calculation processing is omitted. As a result, it is possible to achieve an increase in the processing speed, a saving of power and the like.

When the abovementioned correction unit 18 receives the amount of noise from the noise estimating unit 17 that has been calculated as described above, the correction unit 18 multiplies this amount of noise by the correction gain that has been transmitted from the abovementioned shooting situation estimation unit 16 under the control of the control unit 22, and transmits the results to the noise reducing unit 19.

Next, one example of the construction of the noise reducing unit 19 will be described with reference to FIG. 9.

The noise reducing unit 19 comprises: a horizontal line extraction unit 51 which successively extracts video signals in horizontal line units for each video signal that is output from the abovementioned color signal separating unit 15; a first smoothing unit 52 constituting smoothing means which scans in pixel units the horizontal line video signals extracted by the abovementioned horizontal line extraction unit 51, and performs universally known hysteresis smoothing with the threshold value from a threshold value setting unit 56 (as will be described later) as the amount of noise; a buffer 53 which stores the video signals of one screen for all colors by successively storing the horizontal lines smoothed by the abovementioned first smoothing unit 52; a vertical line extraction unit 54 which successively extracts a video signal for each color signal in vertical line units from the abovementioned buffer 53 after video signals for one screen have been accumulated for all colors in buffer 53; a second smoothing unit 55 constituting smoothing means which successively scans in pixel units the vertical line video signals extracted by the abovementioned vertical line extraction unit 54, performs universally known hysteresis smoothing with the threshold value from a threshold value setting unit 56 (to be described later) as the amount of noise, and successively outputs the smoothed signals to the above-mentioned signal processing unit 20; the threshold value setting unit 56 constituting threshold value setting means which acquires the amount of noise corrected by the abovementioned correction unit 18 in pixel units in accordance with the horizontal lines extracted by the abovementioned horizontal line extraction unit 51 or the vertical lines extracted by the abovementioned vertical line extraction unit 54, sets the amplitude value of the noise as a threshold value, very small amplitude value, and outputs this threshold value to the abovementioned first smoothing unit 52 or the abovementioned second smoothing unit 55.

Here, the hysteresis smoothing performed by the abovementioned first and second smoothing units 52 and 55 is performed in synchronization with the operation of the correction unit 18 and the operation of the threshold value setting unit 56 under the control of the control unit 22.

Furthermore, the abovementioned control unit 22 is connected bidirectionally with the abovementioned horizontal line extraction unit 51, vertical line extraction unit 54 and threshold value setting unit 56, and controls these units.

Furthermore, in the above description, the amount of noise is estimated in pixel units. However, the present invention is not limited to this; it would also be possible to devise the system such that the amount of noise is estimated for each arbitrary specified unit area such as 2×2 pixels, 4×4 pixels or the like. In this case, the precision of noise estimation drops; on the other hand, however, this offers the advantage of allowing high-speed processing.

Furthermore, in the above description, a single CCD in which the color filters 4 were primary color Bayer type filters was described as an example. However, the present invention is not limited to this; for example, the present invention can also be similarly applied to a single CCD in which the color filters 4 are complementary color filters. Furthermore, the present invention can also be similarly applied in the case of two (2) CCDs or three (3) CCDs.

Furthermore, in the above description, focus information and exposure information are used to estimate the shooting situation. However, the present invention is not limited to this; it would also be possible to estimate the shooting situation using at least one type of information selected from among zoom position information, eye sensing information, strobe light emission information and the like, or to estimate the shooting situation more precisely by appropriately combining such information.

In this first embodiment, the amount of noise is estimated for each region of the image and for each color signal; accordingly, appropriate noise reduction can be accomplished in light areas and dark areas, so that a high-quality image can be obtained.

Furthermore, various types of parameters such as the signal value level relating to the amount of noise, the temperature of the image pickup element during shooting, the shutter speed, the gain and the like are determined dynamically for each shooting operation, and the amount of noise is calculated on the basis of these parameters; accordingly, the amount of noise can be calculated with high precision. In this case, the precision can be increased even further by estimating the amount of noise in pixel units.

Furthermore, since the shooting situation is determined and the estimated amount of noise is corrected, images with subjectively desirable high quality can be obtained. In this case, the shooting situation of the overall image is determined by synthesizing various types of information during shooting; accordingly, a low cost and high-speed processing can be realized.

By using focus information, exposure information and the like to determine the shooting situation, it is possible to estimate whether or not the shooting is for a night scene, and to estimate the category, i.e., close-up, portrait, scenery or the like, into which the shooting is to be classified.

Furthermore, since signals from an image pickup element that has color filters are separated into color signals for each color filter, it is possible to accomplish noise reduction in diverse image pickup systems, e.g., primary color systems or complementary color systems, and single CCD, two CCD or three CCD systems.

Furthermore, since the amount of noise is set as a threshold value, and signals below this threshold value are eliminated as noise, signals above this threshold value are preserved as original signals, so that a high-quality image in which only the noise components are reduced can be obtained.

Furthermore, since standard values are set for parameters that could not be obtained at the time of shooting, and since the coefficients used to calculate the amount of noise are determined using these standard values together with the parameters that are obtained, and the amount of noise is calculated from these coefficients, the amount of noise can be estimated and a stable noise reducing effect can be obtained even in cases where necessary parameters cannot be obtained at the time of shooting. In this case, since functions are used to calculate the amount of noise, the amount of memory that is required can be reduced, so that the cost can be reduced. In addition, an image pickup system in which the cost is reduced and power is saved can be constructed by deliberately omitting some of the parameter calculations.

Figure 10:
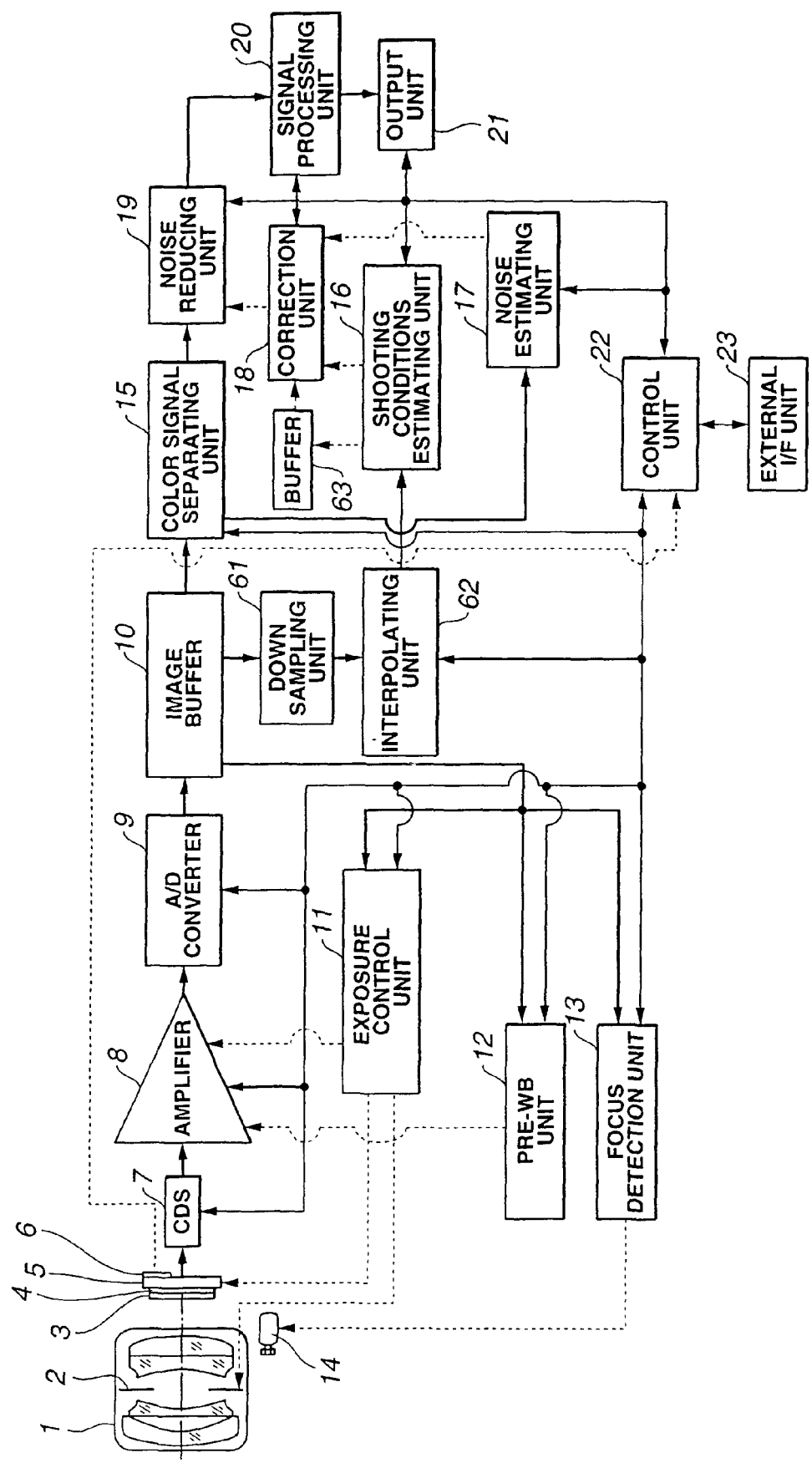
FIG. 10 is a block diagram which shows the construction of the image pickup system of a second embodiment of the present invention.
Figure 11A:
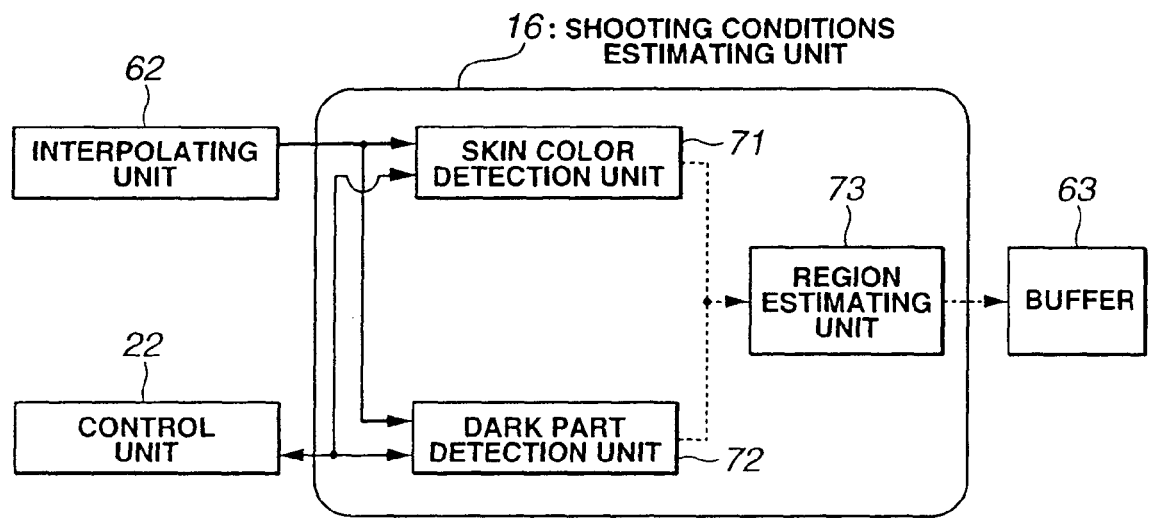
FIG. 11A is a block diagram which shows one example of the construction of the shooting situation estimating unit in the abovementioned second embodiment.
Figure 11B:
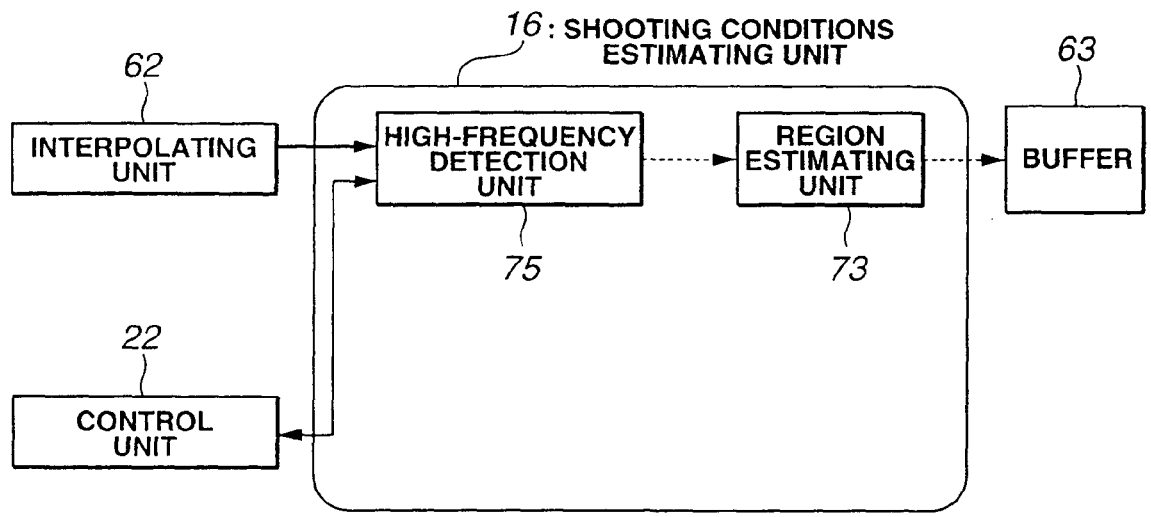
FIG. 11B is a block diagram which shows another example of the construction of the shooting situation estimating unit in the abovementioned second embodiment.
Figure 12:
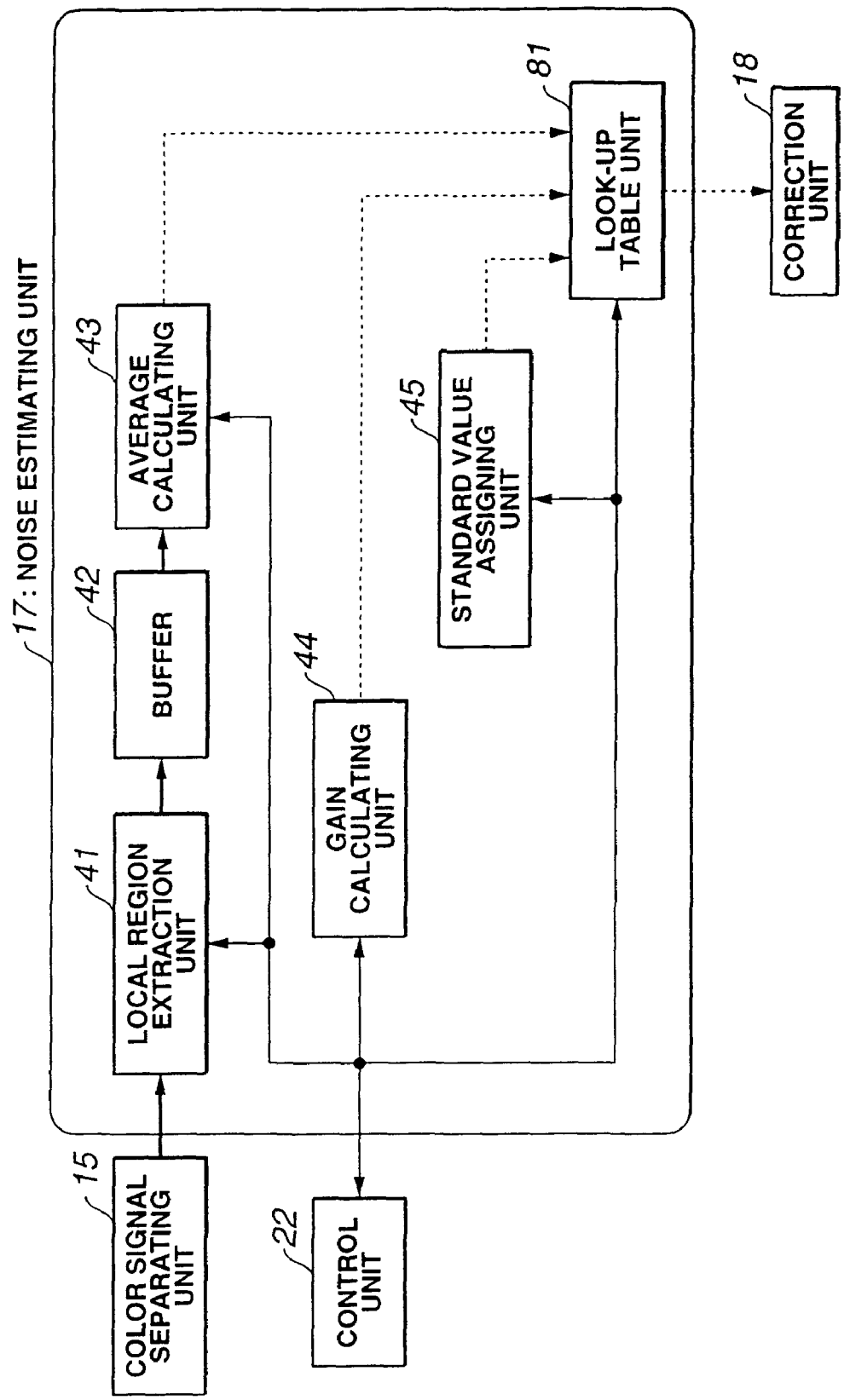
FIG. 12 is a block diagram which shows the construction of the noise estimating unit in the abovementioned second embodiment.
Figure 13:
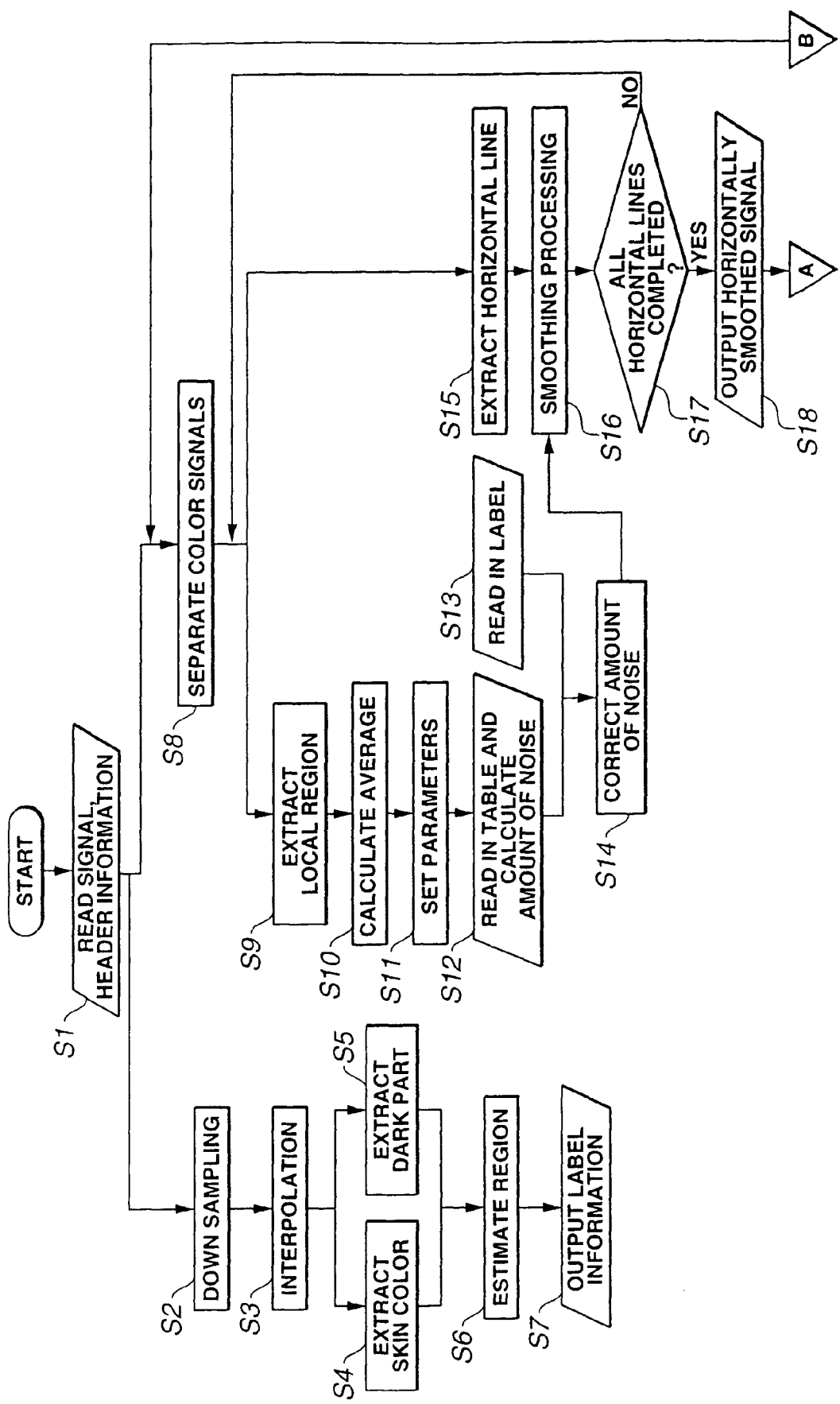
FIG. 13 is a flow chart which shows one portion of the noise reduction processing performed by means of an image processing program in a computer in the abovementioned second embodiment.
Figure 14:
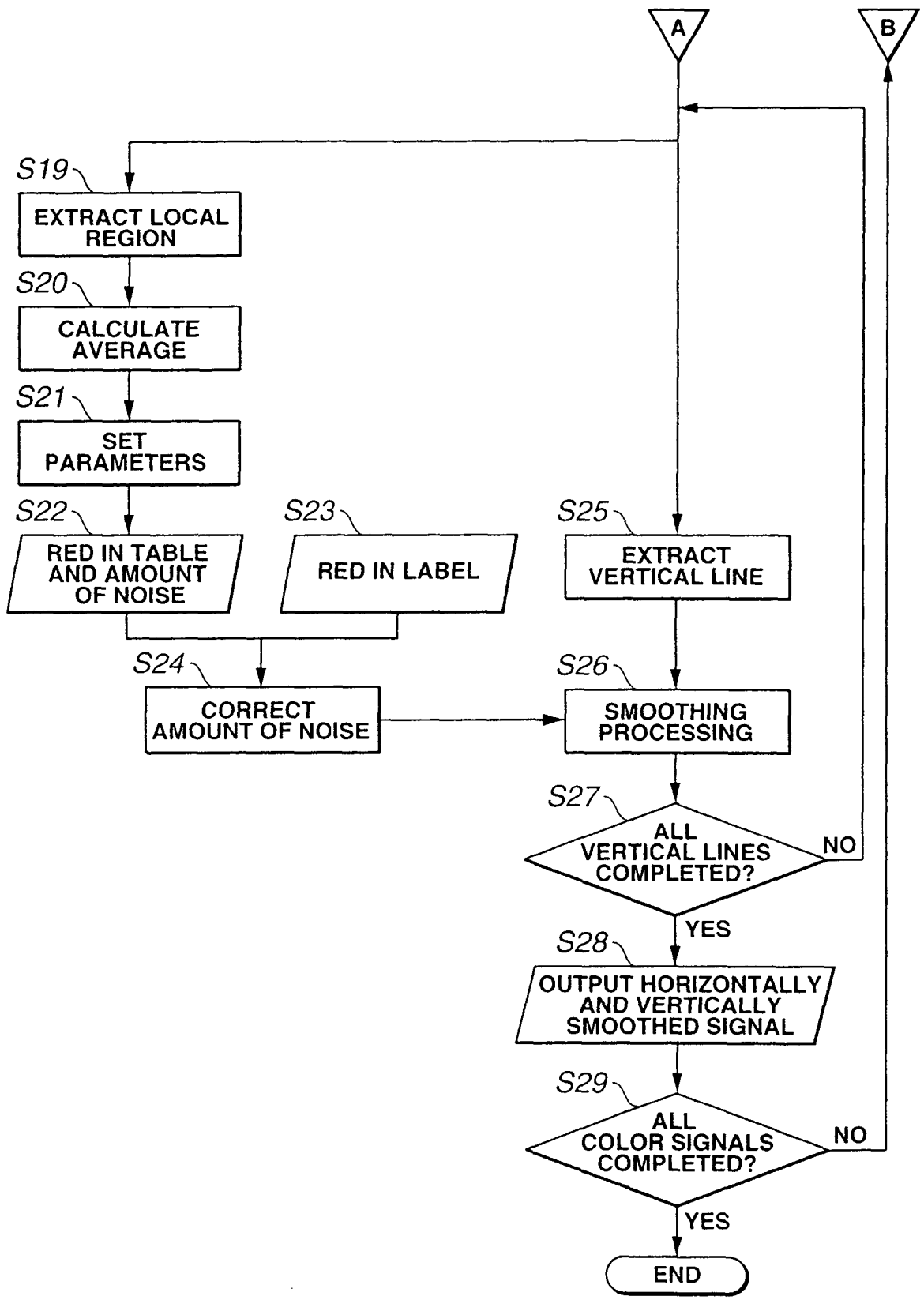
FIG. 14 is a flow chart which shows another portion of the noise reduction processing performed by means of an image processing program in a computer in the abovementioned second embodiment.

FIGS. 10 through 14 show a second embodiment of the present invention. FIG. 10 is a block diagram which shows the construction of the image pickup system, FIGS. 11A and 11B are block diagrams which show examples of the construction of the shooting conditions estimation unit, FIG. 12 is a block diagram which shows the construction of the noise estimating unit, FIG. 13 is a flow chart which shows another portion of the noise reduction processing that is performed by the image processing program in a computer, and FIG. 14 is a flow chart which shows a portion of the noise reduction processing that is performed by the image processing program in a computer.

In this second embodiment, parts that are the same as in the abovementioned first embodiment are labeled with the same symbols, and a description of such parts is omitted. For the most part, only points that are different will be described.

As is shown in FIG. 10, in addition to the construction of the abovementioned first embodiment, the image pickup system of this second embodiment comprises: a down sampling unit 61 comprising down sampling means which thins the video signals read out from the abovementioned image buffer 10 at a specified interval; an interpolating unit 62 which performs universally known linear interpolation processing on the video signals down sampled by the abovementioned down sampling unit 61, thus producing an RGB three CCD image, and outputs the result to the abovementioned shooting conditions estimation unit 16; and a buffer 63 which temporarily stores the information for the labeled image regions estimated by the abovementioned shooting conditions estimation unit 16, and outputs this information to the abovementioned correction unit 18. The abovementioned interpolating unit 62 is connected bidirectionally with the abovementioned control unit 22, and is controlled by the control unit 22.

The flow of signals in the image pickup system shown in FIG. 10 is basically the same as in the abovementioned first embodiment; only portions that are different will be described.

When it is detected via the external I/F unit 23 that the shutter button has been fully pressed, real shooting is performed as described above, and a video signal is transmitted to the image buffer 10.

The down sampling unit 61 reads out the video signal inside the image buffer 10, thins this signal at a specified interval, and transmits the signal to the interpolating unit 62. Since Bayer type color filters are premised to be the color filters 4 in the present embodiment, the down sampling processing performed by the down sampling unit 61 is performed with 2×2 pixels as the basic unit. In concrete terms, for example, down sampling which reads in only the upper left 2×2 pixels for 16×16 pixel units is performed. As a result of such down sampling processing being performed, the video signal is reduced to a size of (⅛)×(⅛), i.e., a data size of ¹⁄₆₄.

The interpolating unit 62 produces an RGB three CCD image by performing universally known linear interpolation processing on the video signal that has been sampled down by the abovementioned down sampling unit 61, and transmits the video signal of the three CCD image thus produced to the shooting situation estimation unit 16.

The shooting conditions estimation unit 16 calculates information relating to skin color, dark portions, high-frequency regions and the like from the video image converted into a three CCD image that is transmitted from the interpolating unit 62, divides the shooting image into a plurality of regions on the basis of the calculated information, and labels the information for the respective regions.

The buffer 63 stores the information transmitted from the shooting situation estimation unit 16.

Under the control of the control unit 22, the noise estimating unit 17 calculates the amount of noise for the respective color signals received from the color signal separating unit 15 for each specified size, e.g., in pixel units in the present embodiment, and transmits the calculated amount of noise to the correction unit 18.

On the basis of the label information read out from the above-mentioned buffer 63, the correction unit 18 corrects the amount of noise that is output from the noise estimating unit 17, and transmits the corrected amount of noise to the noise reducing unit 19. In this case, correction unit 18 subjects the label information of the buffer 63 to expansion processing in accordance with the proportion of down sampling performed by the down sampling unit 61, and performs processing corresponding to the amount of noise in pixel units from the noise estimating unit 17.

Under the control of the control unit 22, the processing in the abovementioned noise estimating unit 17 and the processing in the correction unit 18 are performed in synchronization with the processing of the noise reducing unit 19.

The subsequent processing performed in the noise reducing unit 19, signal processing unit 20 and output unit 21 is the same as in the abovementioned first embodiment.

Next, one example of the construction of the shooting conditions estimation unit 16 will be described with reference to FIG. 11A.

The shooting conditions estimation unit 16 comprises: a skin color detection unit 71 constituting specific color detection means which is image characteristic detection means that reads out RGB three CCD images from the abovementioned interpolating unit 62, calculates color difference signals Cb and Cr, extracts skin color regions by specified threshold value processing, and applies labels; a dark part (i.e., area) detection unit 72 constituting specific brightness detection means which is image characteristic detection means that reads out RGB three CCD images from the abovementioned interpolating unit 62, calculates a brightness signal Y, extracts dark regions which are smaller than a specified threshold value, and applies labels; and a region estimating unit 73 constituting region estimating means that transmits region estimation results, which are derived on the basis of information from the abovementioned skin color detection unit 71 and information from the dark area detection unit 72 and indicate whether or not certain regions are skin color regions and whether or not these regions are dark regions, to the above-mentioned buffer 63.

Furthermore, the abovementioned control unit 22 is connected bidirectionally with the abovementioned skin color detection unit 71 and dark area detection unit 72, and controls these units.

When an RGB three CCD image is read out from the interpolating unit 62, the abovementioned skin color detection unit 71 converts this image into signals of specific color spaces, e.g., color difference signals Cb and Cr in Y, Cb and Cr spaces, as shown in equation 7 and equation 8 below.

$$Cb = -0.16874R - 0.33126G + 0.50000B \quad (7)$$

$$Cr = 0.50000R - 0.41869G - 0.08131B \quad (8)$$

Then, the skin color detection unit 71 extracts only skin color regions by comparing these two color difference signals Cb and Cr with a specified threshold value.

Furthermore, using these results, the skin color detection unit 71 labels the down sampled three CCD image in pixel units, and transmits this image to the region estimating unit 73. In regard to the concrete labels that are applied in this case, for example, 1 is applied to skin color regions, and 0 is applied to other regions.

Next, when an RGB three CCD image is read out from the interpolating unit 62, the abovementioned dark area detection unit 72 converts this into a brightness signal as shown in the following equation 9.

$$Y = 0.29900R + 0.58700G + 0.11400B \quad (9)$$

Furthermore, the dark area detection unit 72 compares this brightness signal Y with a specified threshold value, and extracts regions that are smaller than this threshold value as dark regions.

Furthermore, using these results, the dark area detection unit 72 labels the down sampled three CCD image in pixel units, and transmits this image to the region estimating unit 73. With regard to the concrete labels that are applied in this case, for example, 2 is applied to dark regions, and 0 is applied to other regions.

On the basis of information from the skin color detection unit 71 and information from the dark area detection unit 72, the region estimating unit 73 outputs skin color regions as 1, dark regions as 2, regions that are both skin color regions and dark regions as 3, and other regions as 0, to the buffer 63.

The correction unit 18 reads out this label information from the buffer 63, and adjusts the gain used for correction in accordance with the values of the labels. For example, in the case of the label 3 (skin color region and dark region), the gain is set as "strong" (e.g., 1.5 to 2.0), in the case of the label 1 (skin color region) or label 2 (dark region), the gain is set as "medium" (e.g., 1.0 to 1.5), and in the case of the label 0 (other), the gain is set as "weak" (e.g., 0.5 to 1.0).

Furthermore, in the example shown in FIG. 11A, color information and brightness information are used to estimate the shooting situation of the respective regions in the image. However, the present invention is not limited to the use of such information; for example, it would also be possible to use frequency information as shown in FIG. 11B.

Another example of the construction of the shooting conditions estimation unit 16 will be described with reference to FIG. 11B.

The shooting conditions estimation unit 16 comprises: a high-frequency detection unit 75 constituting frequency detection means which is image characteristic detection means that reads out RGB three CCD images from the abovementioned interpolating unit 62 in block units, and detects high-frequency components; and the region estimating unit 73 which applies labels proportional to the high-frequency components detected by the abovementioned high-frequency detection unit 75, and transmits the labeled images to the buffer 63. The abovementioned high-frequency detection unit 75 is connected bidirectionally with the abovementioned control unit 22, and is controlled by the control unit 22.

In greater detail, the abovementioned high-frequency detection unit 75 reads out RGB three CCD images from the abovementioned interpolating unit 62 in a specified block size, e.g., in 8×8 pixel units, converts these images into frequency components by a universally known DCT (discrete cosine transform), determines the quantity of high-frequency components in each block from the frequency components produced by this conversion, and transmits this data to the region estimating unit 73 in block units.

The region estimating unit 73 applies labels proportional to the quantity of high-frequency components to the blocks, and transmits these labeled blocks to the buffer 63.

The correction unit 18 reads out the label information stored in the buffer 63, subjects this label information to expansion processing in accordance with the proportion of down sampling performed by the abovementioned down sampling unit 61 and the block size used in the abovementioned high-frequency detection unit 75, and corrects the amount of noise in pixel units transmitted from the noise estimating unit 17.

Furthermore, in the above description, conversion into frequency components is accomplished by DCT. However, the present invention is of course not limited to this; appropriate conversion such as Fourier conversion, wavelet conversion or the like may be widely used.

Next, one example of the construction of the noise estimating unit 17 will be described with reference to FIG. 12.

The basic construction of the noise estimating unit 17 is similar to that of the noise estimating unit 17 shown in FIG. 5 in the abovementioned first embodiment; however, this embodiment differs from the first embodiment in that a look-up table unit 81 constituting look-up table means which is noise amount calculating means is provided instead of the abovementioned coefficient calculating unit 46, parameter ROM 47 and function calculating unit 48.

The look-up table unit 81 is connected bidirectionally with the control unit 22, and is controlled by the control unit 22; the look-up table unit 81 inputs information from the abovementioned average calculating unit 43, gain calculating nit 44 and standard value assigning unit 45, and outputs processing results to the correction unit 18.

The look-up table unit 81 is a unit which constructs and records the relationships between the signal value level, gain, shutter speed and temperature of the image pickup element, and the amount of noise beforehand as a look-up table by means similar to those used in the abovementioned first embodiment. On the basis of the signal value levels of pixels of interest calculated by the abovementioned average calculating unit 43, the gain calculated by the abovementioned gain calculating unit 44, information relating to the shutter speed and temperature of the image pickup element transmitted from the abovementioned control unit 22, and standard values assigned as necessary from the abovementioned standard value assigning unit 45, the look-up table unit 81 refers to the look-up table and estimates the amount of noise, and transmits this amount of noise to the correction unit 18.

Furthermore, in the above description, the system is constructed such that noise reduction processing is performed at the time of shooting; however, the present invention is not limited to this. For example, the video signals output from the CCD 5 may be handled as unprocessed raw data, and information from the abovementioned control unit 22 such as the temperature of the image pickup element during shooting, the gain, the shutter speed and the like may be added to this raw data as header information. The system may be devised such that raw data to which this header information has been added is output to a processing device such as a computer or the like, and is processed by software in this processing device.

An example in which noise reduction processing is performed by an image processing program in a computer will be described with reference to FIGS. 13 and 14. Furthermore, FIGS. 13 and 14 relate to a series of processing operations.

When the processing is started, the full color signals constituting the raw data, and header information including information such as the temperature, gain, shutter speed and the like, are first read in (step S1).

Next, the video signals are sampled down to a specified size (step S2), and an RGB three CCD image is produced by universally known linear interpolation (step S3).

Color difference signals Cb and Cr are determined from the RGB thus produced, and colors in which these color difference signals Cb and Cr are within a specified range are extracted as skin color regions (step S4).

Meanwhile, a brightness signal Y is determined from the RGB produced in the abovementioned step S3, and regions in which this brightness signal Y is below a specified threshold value are extracted as dark regions (step S5).

Labeling relating to the skin color regions extracted in step S4 and the dark regions extracted in step S5 is performed (step S6), and the applied label information is output (step S7).

Next, the video signals read in step S1 are separated into respective color signals (step S8), and local regions of a specified size centered on the pixels of interest, e.g., local regions of 4×1 pixel units are extracted (step S9). The signal value levels of the pixels of interest are then calculated to be average values for the local regions (step S10).

Furthermore, parameters such as the temperature, gain, shutter speed and the like are determined from the header information read in, in step S1; in this case, if required parameters are absent from the header information, specified standard values are assigned (step S11).

The amount of noise is calculated by referring to the look-up table on the basis of the signal value levels determined in step S10 and the parameters such as the temperature, gain, shutter speed and the like determined in step S11 (step S12).

Meanwhile, the label information output in step S7 is read in, and labels corresponding to the pixels of interest are transmitted to step S14 (step S13).

The amount of noise determined in step S12 is corrected on the basis of the label information read in, in step S13 (step S14).

The color signals separated in step S8 are extracted in horizontal line units (step S15), and universally known hysteresis smoothing is performed on the basis of the amount of noise corrected in step S14 (step S16).

Then, a judgement is made as to whether or not processing has been completed for all horizontal lines (step S17), and in cases where this processing has not been completed, the processing of the abovementioned steps S9 through S16 is repeated.

On the other hand, in cases where processing has been completed for all horizontal lines, a signal that is smoothed in the horizontal direction is output (step S18).

Next, for the signal that has been smoothed in the horizontal direction, local regions of a specified size centered on the pixels of interest, e.g., local regions comprising 1×4 pixel units, are extracted (step S19), and the signal value levels of the pixels of interest are calculated to be average values for these local regions (step S20).

Furthermore, parameters such as the temperature, gain, shutter speed and the like are determined from the header information read in, in step S1; in this case, if required parameters are absent from the header information, specified standard values are assigned (step S21).

The amount of noise is calculated by referring to the look-up table on the basis of the signal value levels determined in step S20 and the parameters such as the temperature, gain, shutter speed and the like determined in step S21 (step S22).

Meanwhile, the label information output in step S7 is read in, and labels corresponding to the pixels of interest are transmitted to step S24 (step S23).

The amount of noise determined in step S22 is corrected on the basis of the label information read in step S23 (step S24).

The color signals smoothed in the horizontal direction in step S18 are extracted in vertical line units (step S25), and universally known hysteresis smoothing is performed on the basis of the amount of noise corrected in step S24 (step S26).

Then, a judgement is made as to whether or not processing has been completed for all of the vertical lines (step S27), and if this processing has not been completed, the processing of the abovementioned steps S19 through S26 is repeated.

On the other hand, in cases where processing has been completed for all of the vertical lines, a signal that has been smoothed in both the horizontal direction and vertical direction is output (step S28).

Afterward, a judgement is made as to whether or not processing has been completed for all color signals (step S29); if this processing has not been completed, the processing of the abovementioned steps S8 through S28 is repeated. On the other hand, if processing has been completed, this processing is ended.

In this second embodiment, an effect that is more or less similar to that of the abovementioned first embodiment can be obtained; furthermore, since the shooting situation for respective regions in one shooting image is determined by performing skin color detection, dark area detection and high-frequency detection, and the amount of noise is corrected for each region, high-precision noise reduction processing which is suited to respective regions can be performed, so that an image with subjectively desirable high quality can be obtained. Furthermore, it is also possible to construct diverse image pickup systems according to applications by applying either the determination of the shooting situation of the overall signal as indicated in the first embodiment, or the determination of the shooting situation of respective regions as indicated in this second embodiment, as required.

Furthermore, since the shooting situation for respective regions is estimated from signals whose size has been reduced by down sampling the video signals at a specified interval, high-speed processing is possible, and the memory size used for operation can be reduced; accordingly, an image pickup system can be constructed at a low cost.

Furthermore, since a look-up table is used when the amount of noise is calculated, high-speed processing can be performed.

Moreover, the present invention is not limited to the embodiment described above; various modifications and applications are possible within a range that involves no departure from the spirit of the invention.

In this invention, it is apparent that working modes differing over a wide range can be formed on the basis of this invention without departing from the spirit and scope of the invention. This invention is not restricted by any specific embodiment except as may be limited by the appended claims.

The invention claimed is:

1. An image pickup system comprising:
a noise estimator for estimating an amount of noise related to random noise and contained in a digitized signal from an image pickup element composed of an array of a plurality of pixels, either for each pixel or for each specified unit area comprising a plurality of pixels;
a shooting condition estimator for estimating a shooting condition when an image based on said signal is acquired, based on at least one of control information related to a shooting unit and information related to said signal;
a correction unit for correcting the amount of noise itself estimated by the noise estimator based on the shooting condition estimated by the shooting condition estimator; and
a noise reducing unit for reducing the noise related to random noise in the signal based on the amount of noise itself corrected by the correction unit.

2. The image pickup system according to claim 1, further comprising:
color filters arranged on a front surface of the image pickup element; and
a separating unit for separating the signal that is output from the image pickup element into signals for each color filter.

3. The image pickup system according to claim 2, wherein the noise estimator comprises:
a parameter calculator for calculating parameters based on at least one type of information selected from among a signal value level of the signal, a temperature of the image pickup element, a gain for the signal, and a shutter speed during shooting; and
a noise amount calculator for calculating the amount of noise based on the parameters calculated by the parameter calculator.

4. The image pickup system according to claim 3, wherein the noise amount calculator comprises a unit that calculates an amount of noise N using a signal value level L of the signal, a temperature T of the image pickup element, a gain G for the signal and a shutter speed S during shooting as parameters, and comprises:

a coefficient calculator for calculating four coefficients A, B, C and D based on three functions a(T, G), b(T, G) and c(T, G) using the temperature T and gain G as parameters, and a function d(S) using the shutter speed S as a parameter; and a function calculator for calculating the amount of noise N where:

$$N=(AL^B+C)D$$

defined by the four coefficients A, B, C and D calculated by the coefficient calculator.

5. The image pickup system according to claim 4, wherein the noise amount calculator further comprises an assigning unit for assigning standard parameter values, and the parameters are one of values calculated by the parameter calculator, and standard values assigned by the assigning unit.

6. The image pickup system according to claim 3, wherein the noise amount calculator comprises:

an assigning unit for assigning standard values as standard parameter values for parameters not obtained from the parameter calculator; and a look-up table for determining the amount of noise by inputting the signal value level, temperature, gain and shutter speed obtained from one of the parameter calculator and the assigning unit.

7. The image pickup system according to claim 2, wherein the shooting condition estimator comprises:

a focusing position estimator for estimating, based on focus information, to which shooting a focusing position belongs among three or more types of shooting at least including scenery shooting, portrait shooting and close-up shooting;

a shooting-subject distribution estimator for estimating, based on exposure information, to which shooting the shooting-subject distribution belongs among three or more types of shooting including at least an overall signal, central emphasis or central portion; and an overall estimator for estimating the shooting situation relating to an overall signal when an image based on the signal is acquired, by combining the focusing position estimated by the focusing position estimator and the shooting-subject distribution estimated by the shooting-subject distribution estimator.

8. The image pickup system according to claim 2, wherein the shooting condition estimator comprises an overall estimator for estimating and judging, based on exposure information, whether or not the shooting condition relating to an overall signal when an image based on the signal is acquired is of night view shooting.

9. The image pickup system according to claim 2, wherein the shooting condition estimator comprises:

an image characteristic detector for detecting, based on the signal, characteristics of the image based on the signal; and a regional estimator for estimating the shooting condition of respective regions when an image based on the signal is acquired, based on the image characteristics detected by the image characteristic detector.

10. The image pickup system according to claim 9, wherein the image characteristic detector comprises at least one type of unit selected from among a specific color detector for detecting specific color regions as image characteristics from the signal, a specific brightness detector for detecting specific brightness regions as image characteristics from the signal, and a frequency detector for determining frequency information in local regions of a specified size as image characteristics from the signal.

11. The image pickup system according to claim 9, wherein the image status estimator further comprises a down sampler for down sampling the signal, and the image characteristic detector detects the image characteristics of the image based on the signal down sampled by the down sampler.

12. The image pickup system according to claim 2, wherein the noise reducing unit comprises:

a threshold value setting unit for setting an amplitude value of the noise as a threshold value based on the amount of noise corrected by the correction unit, for one of each pixel, and each specified unit area comprising a plurality of pixels; and a smoothing unit for reducing amplitude components in the signal that are equal to or less than the threshold value set by the threshold value setting unit.

13. The image pickup system according to claim 1, wherein the shooting condition estimator comprises a regional estimating unit for splitting an overall image into a plurality of regions of the image when the image based on the signal is acquired.

14. The image pickup system according to claim 13, wherein the shooting condition estimator estimates a shooting condition when an image based on said signal is acquired, based on brightness information obtained from the regional estimating unit and focus information of the shooting unit contained in the control information.

15. The image pickup system according to claim 1, wherein the control information related to the shooting unit includes at least one of focus information, exposure information obtained by the shooting unit, zoom position information, eye sensing information, and strobe light emission information, and the shooting condition estimator comprises an overall estimator for estimating the shooting condition for an overall signal when an image based on the signal is acquired, based on at least one of the pieces of information included in the control information.

16. The image pickup system according to claim 1, wherein the noise estimator comprises:

a parameter calculator for calculating parameters based on at least one type of information selected from among a signal value level of the signal, a temperature of the image pickup element, a gain for the signal and a shutter speed during shooting; and a noise amount calculator for calculating the amount of noise based on the parameters calculated by the parameter calculator.

17. The image pickup system according to claim 16, wherein the noise amount calculator is configured to calculate the amount of noise N using the signal value level L of the signal, the temperature T of the image pickup element, the gain G for the signal and the shutter speed S during shooting as parameters, and comprise:

a coefficient calculator for calculating four coefficients A, B, C and D based on three functions a(T, G), b(T, G) and c(T, G) using the temperature T and gain G as parameters, and a function d(S) using the shutter speed S as a parameter; and a function calculator for calculating the amount of noise N where:

$$N=(AL^B+C)D$$

defined by the four coefficients A, B, C and D calculated by the coefficient calculator.

18. The image pickup system according to claim 17, wherein the noise amount calculator further comprises an assigning unit for assigning standard parameter values, and the parameters are values calculated by one of the parameter calculator, and standard values assigned by the assigning unit.

19. The image pickup system according to claim 16, wherein the noise amount calculator comprises:
- an assigning unit for assigning standard values as standard parameter values for parameters not obtained from the parameter calculator; and
- a look-up table for determining the amount of noise by inputting the signal value level, temperature, gain and shutter speed obtained from one of the parameter calculator and the assigning unit.

20. The image pickup system according to claim 1, wherein the shooting condition estimator comprises an overall estimator for estimating the shooting condition for an overall signal when an image based on the signal is acquired.

21. The image pickup system according to claim 1, wherein the shooting condition estimator has an overall estimator for estimating the shooting condition for an overall signal when an image base on the signal is acquired, based on at least one type of information selected from among focus information, exposure information, zoom position information, eye sensing information and strobe light emission information.

22. The image pickup system according to claim 1, wherein the shooting condition estimator comprises:
- a focusing position estimator for estimating, based on a focus information, to which shooting the focusing position belongs among three or more types of shooting including at least scenery shooting, portrait shooting and close-up shooting;
- a shooting-subject distribution estimator for estimating, based on exposure information, to which shooting the shooting-subject distribution belongs from among three or more types of imaging including at least an overall signal, central emphasis or central portion; and
- an overall estimator for estimating the shooting situation relating to the overall signal when an image based on the signal is acquired, by combining the focusing position estimated by the focusing position estimator and the shooting-subject distribution estimated by the shooting-subject distribution estimator.

23. The image pickup system according to claim 1, wherein the shooting condition estimator comprises an overall estimator for estimating and judging, based on exposure information, whether or not the shooting condition relating to an overall signal when an image based on the signal is acquired is night view shooting.

24. The image pickup system according to claim 1, wherein the shooting condition estimator comprises:
- an image characteristic detector for detecting, based on the signal, characteristics of the image based on the signal; and
- a regional estimator for estimating the shooting situation of respective regions when an image based on the signal is acquired, based on the image characteristics detected by the image characteristic detector.

25. The image pickup system according to claim 24, wherein the image characteristic detector comprises at least one type of unit selected from among a specific color detector for detecting specific color regions as image characteristics from the signal, a specific brightness detector for detecting specific brightness regions as image characteristics from the signal, and a frequency detector for determining frequency information in local regions of a specified size as image characteristics from the signal.

26. The image pickup system according to claim 24, wherein the image status estimator further comprises a down sampler for down sampling the signal, and the image characteristic detector detects the image characteristics of the image based on the signal down sampled by the down sampler.

27. The image pickup system according to claim 1, wherein the noise reducing unit comprises:
- a threshold value setting unit for setting an amplitude value of the noise as a threshold value based on an amount of noise corrected by the correction unit, for one of each pixel, and for each specified unit area comprising a plurality of pixels; and
- a smoother for reducing amplitude components in the signal that are equal to or less than the threshold value set by the threshold value setting unit.

28. An image processing program stored in a computer readable medium executed by a computer, comprising:
- a noise estimating routine for estimating an amount of noise related to random noise and contained in digitized signals from an image pickup element composed of an array of a plurality of pixels, for one of each pixel and for each specified unit area comprising a plurality of pixels;
- a shooting condition estimating routine, which does not directly affect the image based on said digitized signals, for estimating a shooting condition when an image based on the signal is acquired, and based on at least one of control information related to a shooting unit and information related to said signal;
- a correction routine for correcting an amount of noise itself estimated by the noise estimating routine based on the shooting condition estimated by the shooting condition estimating routine; and
- a noise reducing routine for reducing the noise related to random noise in the signal based on the amount of noise itself corrected by the correction routine.

29. An image pickup system, comprising:
- a parameter calculator for calculating a signal level of a digitized signal from an image pickup element composed of an array of a plurality of pixels, and information provided and which is not relevant to said signal level, as parameters for use to estimate an amount of noise;
- a noise estimator for calculating a coefficient of a function equation for estimating an amount of noise with respect to said signal level as a function that uses, as a variable, a parameter related to the provided, non-relevant information, and estimating an amount of noise contained in said signal, either for each pixel or for each specified unit area comprising a plurality of pixels, using the function equation specified by the calculated coefficient; and a noise reducing unit for reducing noise in said signal based on the amount of noise estimated by the noise estimator.

30. The image pickup system according to claim 29, further comprising:
a shooting condition estimator for estimating a shooting condition when an image based on said signal is acquired; and
a correction unit for correcting the amount of noise estimated by the noise estimator based on the shooting condition estimated by the shooting condition estimator,
wherein the noise reducing unit reduces noise in said signal based on the amount of noise corrected by the correction unit.

31. The image pickup system according to claim 29, wherein the information provided independently of said signal level is information of at least one of a temperature of the image pickup element, a gain for the signal, and a shutter speed during shooting.

32. The image pickup system of claim 29, wherein the non-relevant information comprises coefficients used by the noise estimator and which do not vary as on function of signal level.

\* \* \* \* \*